(12) United States Patent
Okamoto et al.

(10) Patent No.: US 9,371,813 B2
(45) Date of Patent: Jun. 21, 2016

(54) CONTROL DEVICE OF DIRECT INJECTION ENGINE

(75) Inventors: Takashi Okamoto, Hitachinaka (JP); Yoshinobu Arihara, Hitachinaka (JP); Takao Miyake, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 654 days.

(21) Appl. No.: 13/536,219

(22) Filed: Jun. 28, 2012

(65) Prior Publication Data

US 2013/0000599 A1    Jan. 3, 2013

(30) Foreign Application Priority Data

Jun. 30, 2011  (JP) ................................. 2011-146235

(51) Int. Cl.
| | |
|---|---|
| *B60T 7/12* | (2006.01) |
| *F02N 11/08* | (2006.01) |
| *F02D 41/06* | (2006.01) |
| *F02D 41/38* | (2006.01) |
| *F02D 41/40* | (2006.01) |
| *F02N 99/00* | (2010.01) |
| *F02D 41/30* | (2006.01) |

(52) U.S. Cl.
CPC .......... *F02N 11/0844* (2013.01); *F02D 41/065* (2013.01); *F02D 41/3076* (2013.01); *F02D 41/3845* (2013.01); *F02D 41/402* (2013.01); *F02N 99/006* (2013.01); *F02D 41/3029* (2013.01); *F02D 2250/31* (2013.01); *F02N 2200/021* (2013.01); *Y02T 10/44* (2013.01); *Y02T 10/48* (2013.01)

(58) Field of Classification Search
CPC ............................ F02D 41/062; F02D 41/402
USPC .......... 701/112, 113; 123/298, 299, 480, 491
See application file for complete search history.

(56) References Cited

U.S. PATENT DOCUMENTS

| | | | |
|---|---|---|---|
| 5,979,413 A * | 11/1999 | Ohnuma et al. | 123/491 |
| 6,340,016 B1 | 1/2002 | Ueda et al. | |
| 6,474,294 B2 | 11/2002 | Yamazaki et al. | |
| 7,900,598 B2 * | 3/2011 | Lewis et al. | 123/347 |
| 2006/0048734 A1 * | 3/2006 | Kataoka et al. | 123/179.4 |
| 2006/0212212 A1 * | 9/2006 | Akasaka | 701/112 |
| 2009/0243574 A1 * | 10/2009 | Mayuzumi et al. | 323/282 |
| 2011/0144891 A1 | 6/2011 | Nakamura et al. | |
| 2011/0155097 A1 * | 6/2011 | Matsumura et al. | 123/299 |
| 2011/0197850 A1 * | 8/2011 | Kawano et al. | 123/294 |

FOREIGN PATENT DOCUMENTS

| | | |
|---|---|---|
| JP | 10-274077 A | 10/1998 |
| JP | 2000-213397 A | 8/2000 |
| JP | 2000-265879 A | 9/2000 |
| JP | 2001-317389 A | 11/2001 |
| JP | 2002-147264 A | 5/2002 |
| JP | 2007-292060 A | 11/2007 |
| JP | 2009-30502 A | 2/2009 |
| JP | 2011-122558 A | 6/2011 |

* cited by examiner

*Primary Examiner* — John Kwon
(74) *Attorney, Agent, or Firm* — Crowell & Moring LLP

(57) ABSTRACT

Provided is a control device of a direct injection engine, the control device that can prevent the amount of emission of soot from increasing and the exhaust performance from worsening when a restart request is made before an engine is stopped after an idle stop condition is satisfied. When a restart request is made before an engine is stopped after an idle stop condition is satisfied, at least one of the number of fuel injections in one combustion cycle and the air/fuel ratio of an air fuel mixture used for combustion is changed for each cylinder according to a piston position at that time.

17 Claims, 9 Drawing Sheets

EXISTING EXAMPLE

INVENTION

CONTROL DEVICE OF DIRECT INJECTION ENGINE

BACKGROUND OF THE INVENTION

1. Field of the Invention

The present invention relates to a control device of an engine that is installed on a vehicle etc. and, in particular, to a control device of a direct injection engine, the control device that is provided with an injector directly injecting fuel into a cylinder (a combustion chamber) and performs idle stop to stop the engine temporarily when the engine and a vehicle equipped with the engine are in a state in which the engine and the vehicle satisfy a predetermined condition.

2. Description of the Related Art

In recent years, from the viewpoint of environmental conservation, vehicles (automobiles) have been expected to achieve a reduction of combustion waste gas (exhaust gas) which turns into greenhouse gas and a reduction of carbon monoxide (CO), hydrocarbon (HC), nitrogen oxides (NOx), etc. which are contained in the combustion waste gas (exhaust gas) (these reductions are referred to as "an improvement in exhaust performance) and a reduction of fuel consumption (an improvement in fuel efficiency), and a direct injection engine that makes an injector directly perform fuel injection into a combustion chamber of each cylinder has been developed to achieve primarily improvements in exhaust performance and fuel efficiency and an improvement in engine output.

Moreover, a vehicle with an idle stop function of performing idle stop to stop an engine temporarily when the engine and a vehicle equipped with the engine are in a state in which the engine and the vehicle satisfy a predetermined condition (for example, a state in which the vehicle stops at a red light) and then restarting the engine by driving a starter upon a restart request to achieve further improvements in fuel efficiency and exhaust performance has also been put to practical use and come into wide use.

Various techniques related to idle stop (engine stop) and restarting in a vehicle equipped with a direct injection engine have been proposed. For example, JP-A-2010-236546 proposes a technique of determining whether or not a stop position of a piston of a certain cylinder is a stop position in which compression injection combustion can be performed and starting fuel injection when the piston stop position in the cylinder is a specific position in which compression injection combustion can be performed.

Moreover, for example, JP-A-2007-23815 proposes a technique of making a compression stroke cylinder inject fuel and ignite the fuel when a restart request is made before an engine (rotation) is stopped after an idle stop condition is satisfied and the engine rotation speed at that time is higher than a predetermined value and making the compression stroke cylinder and an expansion stroke cylinder inject fuel and ignite the fuel when the engine rotation speed is lower than the predetermined value.

As described above, in recent years, in a direct injection engine that is installed on a vehicle with an idle stop function, various restarting techniques to achieve primarily improvements in fuel efficiency and exhaust performance have been proposed. To achieve further improvements in fuel efficiency and exhaust performance, the number of times an idle stop (engine stop) condition is satisfied is increasing, and a restarting technique used when a restart request is made based on, for example, the driver's intention before the engine (rotation) is stopped becomes more important.

A restart request before the engine (rotation) is stopped after an idle stop (engine stop) condition is satisfied is determined by the driver's intention. However, various piston positions at the time of issuance of the restart request and combustion at the time of extremely low rotation result in unstable combustion and eventually an increase in the amount of emission of soot caused by misfire and poor exhaust performance if an appropriate fuel injection (injection start timing and injection time=injection quantity) is not performed.

SUMMARY OF THE INVENTION

In view of the problems mentioned above, it is an object of the present invention to provide a control device of a direct injection engine, the control device that can perform appropriate fuel injection in accordance with the piston position of each cylinder when a restart request is made before an engine is stopped after an idle stop condition is satisfied and can prevent the amount of emission of soot from increasing and the exhaust performance from worsening.

To achieve the above object, in accordance with an aspect of the invention, a control device of a direct injection engine includes an injector directly injecting fuel into a combustion chamber and performs idle stop to stop an engine temporarily when the engine and a vehicle equipped with the engine are in a state in which the engine and the vehicle satisfy a predetermined condition, and, when a restart request is made before the engine is stopped after the idle stop condition is satisfied, at least one of the number of fuel injections in one combustion cycle and the air/fuel ratio of an air fuel mixture used for combustion is changed for each cylinder according to a piston position at that time.

In the control device of the direct injection engine according to the aspect of the invention, when a restart request is made before the engine is stopped after an idle stop (engine stop) condition is satisfied, at least one of the number of fuel injections in one combustion cycle and the air/fuel ratio of an air fuel mixture used for combustion is changed for each cylinder according to a piston position at that time, in other words, an optimum restart combustion mode is determined by the performance of a computation and is selected according to a piston position at that time. This makes it possible to achieve stable combustion and improvements in exhaust performance and fuel efficiency.

Other problems, configurations, and effects will be made clear in the following embodiment.

DESCRIPTION OF THE PREFERRED EMBODIMENTS

Hereinafter, an embodiment of the invention will be described with reference to the drawings.

Figure 1:
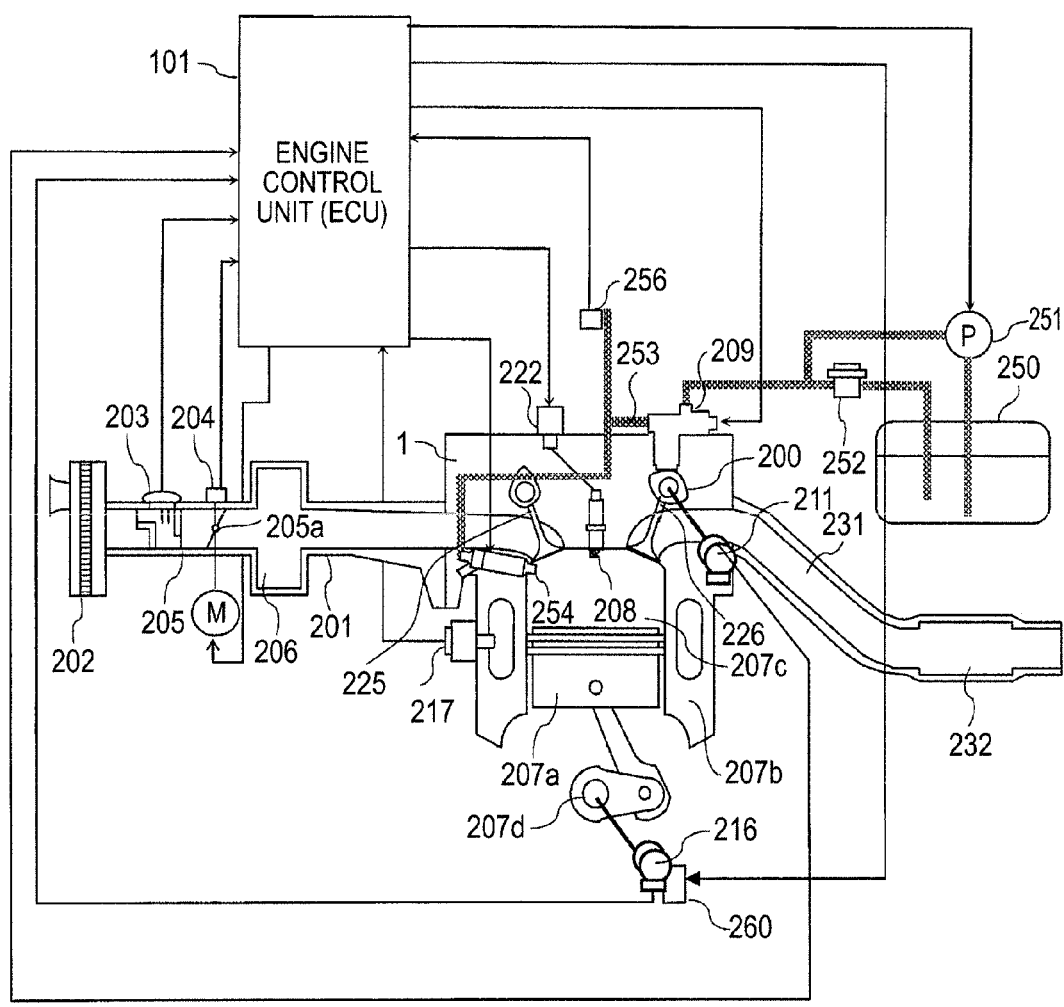
FIG. 1 is a schematic configuration diagram showing an embodiment of a control device of a direct injection engine according to the invention.

FIG. 1 is a schematic configuration diagram showing an embodiment of a control device according to the invention along with a direct injection engine to which the control device is applied.

A direct injection engine 1 shown in the drawing is, for example, an in-line four-cylinder gasoline engine having four cylinders (#1, #2, #3, and #4). The air that is supplied to (a combustion chamber 207c of) each cylinder 207b is taken in through an inlet of an air cleaner 202, passes by an air flow sensor 203, passes through a throttle body 205 in which an electrically controlled throttle valve 205a is housed, and then enters a collector 206. The air sucked into the collector 206 is distributed among outlets of an intake manifold (a manifold) 201, the outlets connected to the cylinders 207b, and is then guided to the combustion chamber 207c formed above a piston 207a through an induction valve 225.

From the air flow sensor 203, a signal indicating the intake air mass is output to an engine control unit 101 forming a principal portion of the control device of the embodiment of the invention. Furthermore, to the throttle body 205, a throttle sensor 204 detecting the degree of opening of the electrically controlled throttle valve 205a is attached, and a signal indicating the degree of opening of the electrically controlled throttle valve 205a is also output to the engine control unit 101.

On the other hand, fuel such as gasoline is supplied from a fuel tank 250 to an injector 254 provided in each cylinder 207b through an accumulator (hereinafter referred to as a common rail) 253 after being subjected to primary pressurization by a low-pressure fuel pump 251 so that the pressure thereof is adjusted to a constant pressure (for example, 0.3 MPa) by a fuel pressure regulator 252 and subjected to secondary pressurization so that the pressure thereof becomes a higher pressure (for example, 5 MPa or 10 MPa) by a high-pressure fuel pump 209 which will be described later, and is directly injected from the injector 254 into the combustion chamber 207c. The air fuel mixture of the fuel injected into the combustion chamber 207c and the intake air is ignited by a spark of a spark plug 208 to which an ignition signal whose voltage has been raised by an ignition coil 222 and causes explosive combustion to occur, and the combustion waste gas (exhaust gas) is discharged to the outside via an exhaust valve 226 through an exhaust passage 231 in which an exhaust purification catalyst (a three-way catalyst) 232 is provided. Incidentally, in this embodiment, the injector 254 adopts a side injection method by which the fuel is injected from the suction side of the engine 1; however, the injector 254 may adopt a center injection method by which the fuel is injected from right above the combustion chamber 207c.

A crank angle sensor 216 attached on a crank shaft 207d of the engine 1 outputs a signal indicating the rotational position of the crank shaft 207d to the engine control unit 101.

Moreover, the engine 1 is provided with a suction-side variable valve mechanism that can vary the opening and closing timing of the induction valve 225 and an exhaust-side variable valve mechanism that can vary the opening and closing timing of the exhaust valve 226. A cam angle sensor 211 attached to a cam shaft (not shown) of the exhaust-side variable valve mechanism outputs an angular signal indicating the rotational position of the exhaust cam shaft to the engine control unit 101 and also outputs an angular signal indicating the rotational position of a pump drive cam 200 of the high-pressure fuel pump 209, the pump drive cam 200 rotating with the rotation of the exhaust cam shaft, to the engine control unit 101. Based on the signals from the crank angle sensor 216 and the cam angle sensor 211, a computation is performed to determine the stroke of each cylinder in one combustion cycle (an intake stroke, a compression stroke, an expansion stroke, and an exhaust stroke), and a piston position (for example, an angle at which the piston is located, the angle before the T.D.C in the compression stroke, in terms of a crank angle).

Furthermore, a starter 260 drives and rotates the crank shaft 207d by a drive signal from the engine control unit 101.

Figure 2:
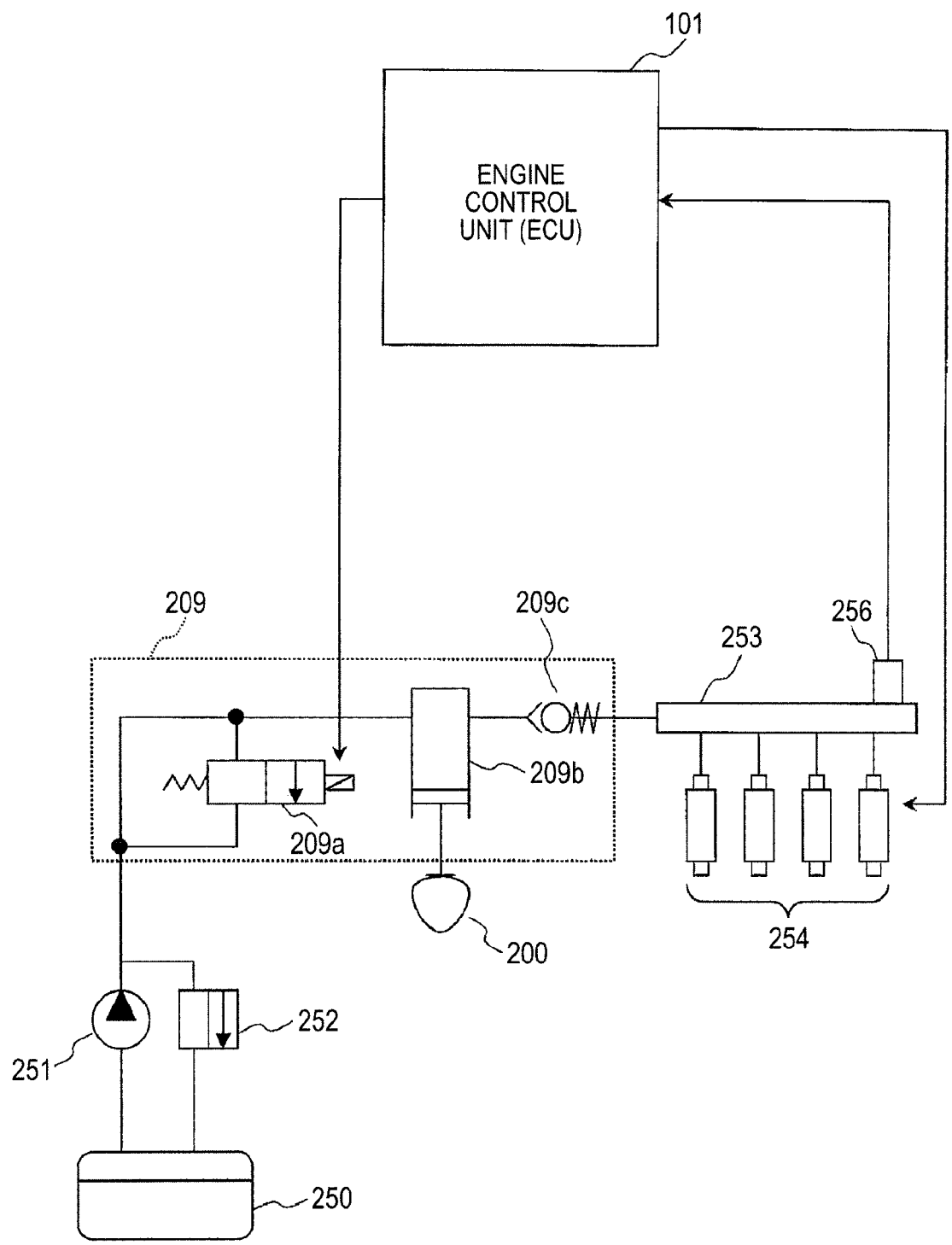
FIG. 2 is a schematic configuration diagram of a fuel system of the direct injection engine shown in FIG. 1.

FIG. 2 is a schematic configuration diagram of a fuel supply system provided with the high-pressure fuel pump 209.

The high-pressure fuel pump 209 pressurizes the fuel from the fuel tank 250 and pressure-feeds the high-pressure fuel to the common rail 253.

The fuel is guided to a fuel feed port of a pump main body 209 by the low-pressure fuel pump 251 after being adjusted by the pressure regulator 252 so that the pressure of the fuel becomes a constant pressure. On the fuel feed port side, a high-pressure pump control valve 209a which is a normally closed electromagnetic valve (solenoid valve) for controlling the fuel intake is provided. The high-pressure pump control valve 209a closes in the non-energized state and opens in the energized state.

The high-pressure pump control valve 209a is controlled by the engine control unit 101 to adjust the discharge rate of the fuel supplied by the low-pressure fuel pump 251 and thereby control the fuel pressure inside the common rail. The fuel is pressurized by the pump drive cam 200 and in a pressurizing chamber 209b and is pressure-fed to the common rail 253 through a fuel exhaust port. In the fuel exhaust port, a discharge valve 209c is provided to prevent backflow of the high-pressure fuel on the downstream side to the pressurizing chamber. To the common rail 253, the injectors 254 and a pressure sensor 256 for measuring the fuel pressure inside the common rail are attached.

Figure 3:
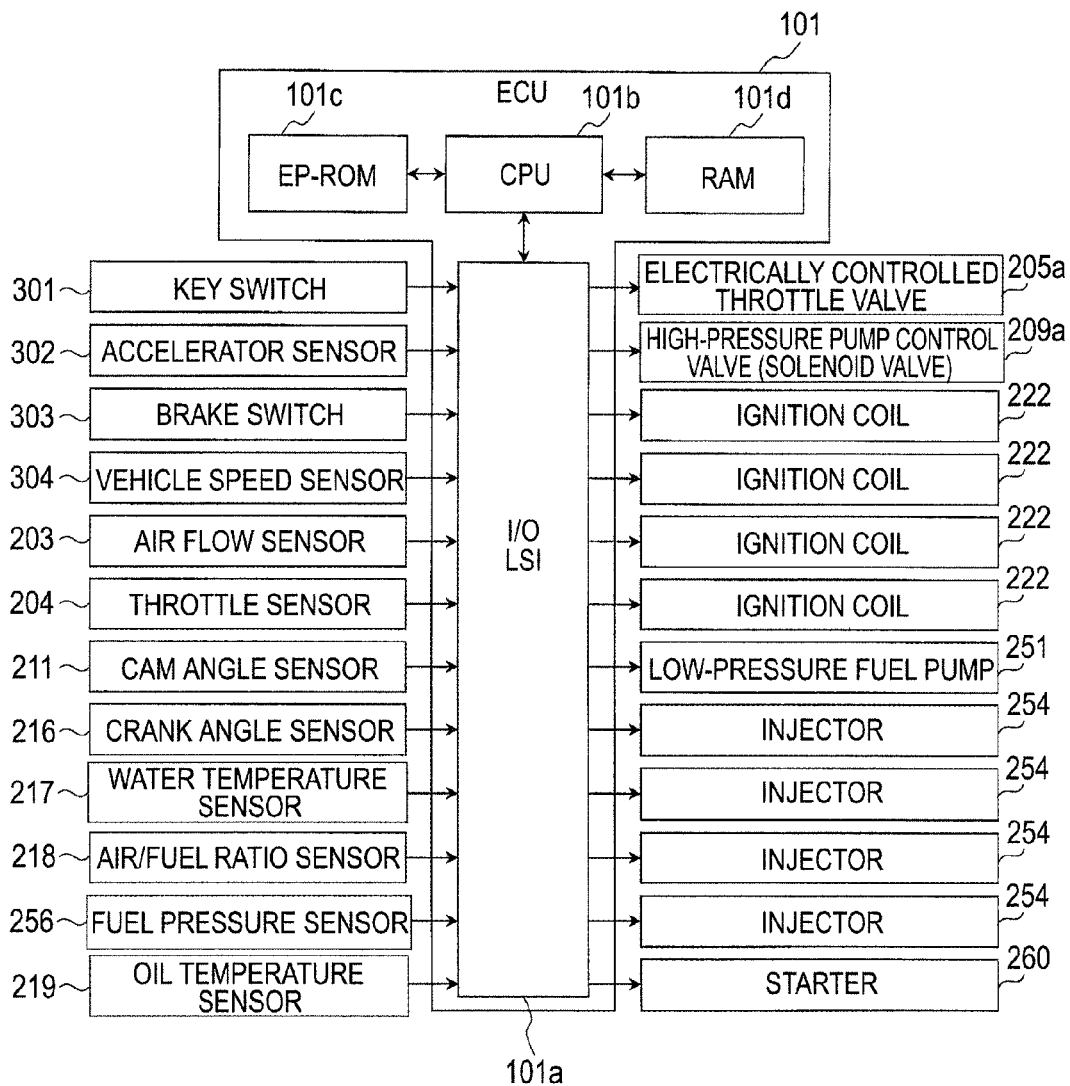
FIG. 3 is a diagram showing the internal configuration and the input-output relation of an engine control unit shown in FIG. 1.

FIG. 3 shows the internal configuration and the input-output relation of the engine control unit 101. The engine control unit 101 is formed of an I/O LSI 101a including an A/D converter, a CPU 101b, an EP-ROM 101c, a RAM 101d, etc. The engine control unit 101 receives, as inputs, signals from a key switch 301, the signals indicating accessory, ignition ON, and starter ON, and signals from various kinds of sensors including an accelerator sensor 302, a brake switch 303, a vehicle speed sensor 304, the air flow sensor 203, the throttle sensor 204, the cam angle sensor 211, the crank angle sensor 216, a water temperature sensor 217, an air/fuel ratio sensor 218, a fuel pressure sensor 256, and an oil temperature sensor 219, performs predetermined arithmetic processing, outputs various control signals calculated as results of arithmetic computations, supplies predetermined control signals to the electrically controlled throttle valve 205a which is an actuator, the high-pressure pump control valve 209a, the ignition coils 222 (of the four cylinders), the low-pressure fuel pump 251, the injectors 254 (of the four cylinders), and the starter 260, and performs control of the fuel pressure inside the common rail, fuel injection control (injection start timing and injection time (injection quantity)), control of the number of injections etc. in one combustion cycle, ignition timing control, starter control, etc. In the I/O LSI 101a, a drive circuit for driving the injectors 254 is provided, and the voltage supplied from a battery is boosted and supplied to the injector 254 of each cylinder.

Next, specific details of fuel injection control of this embodiment will be described.

Figure 4:
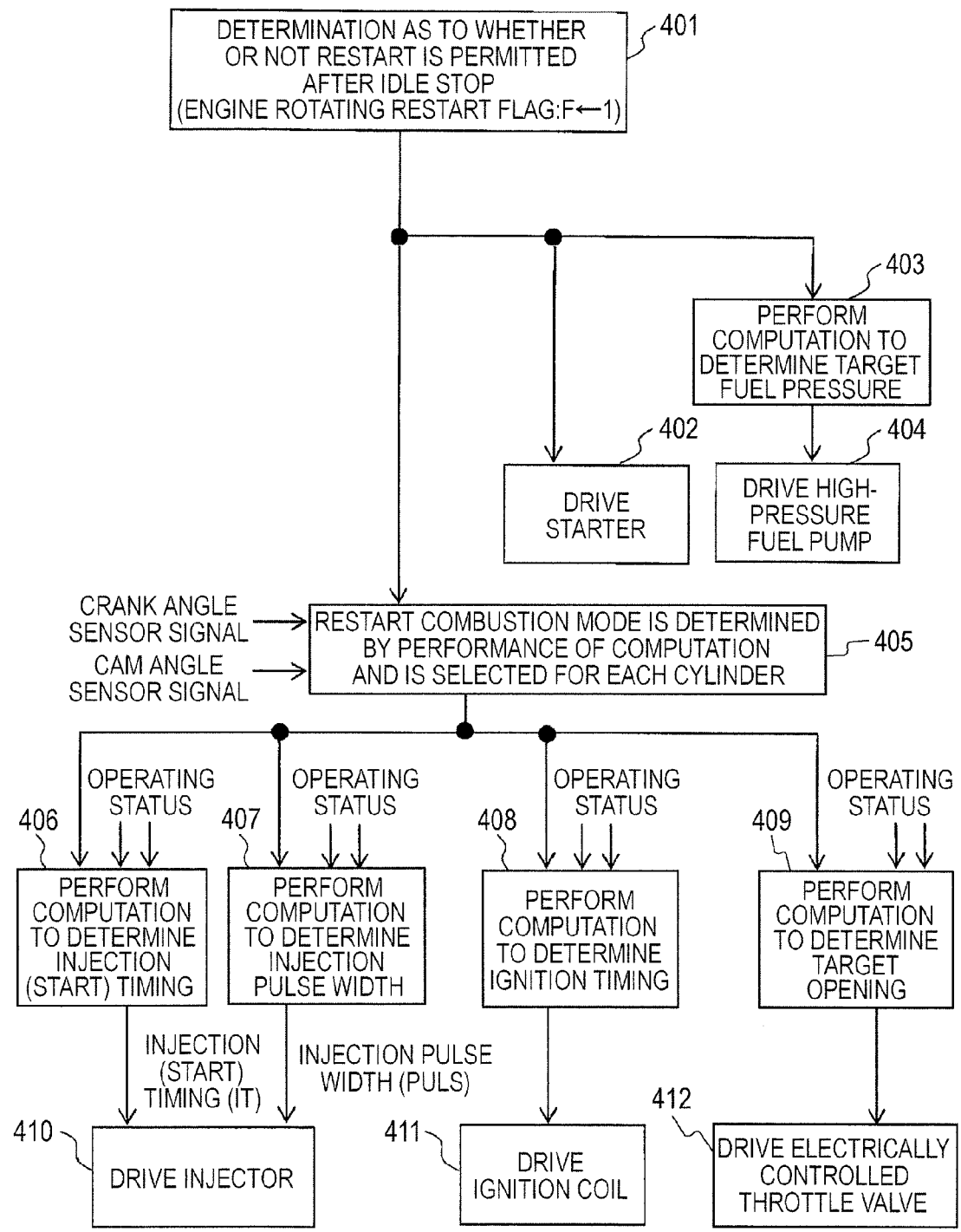
FIG. 4 is a flow block diagram showing the processing of the engine control unit shown in FIG. 1.

FIG. 4 is a flow block diagram showing the processing of the control device of this embodiment.

In block 401, based on the information obtained from the key switch 301, the accelerator sensor 302, the brake switch 303, the vehicle speed sensor 304, etc., it is determined whether or not restart after an idle stop (engine stop) condition is satisfied is permitted, and it is also determined whether or not a restart request is a restart request made before the engine (rotation) is stopped after the idle stop condition is satisfied. If a restart request is a restart request made before the engine is stopped, that is, a restart request made while the engine is rotating, a flag F indicating restart while the engine is rotating (hereinafter referred to as an engine rotating restart flag F) is set to 1 (is turned ON).

Figure 5:
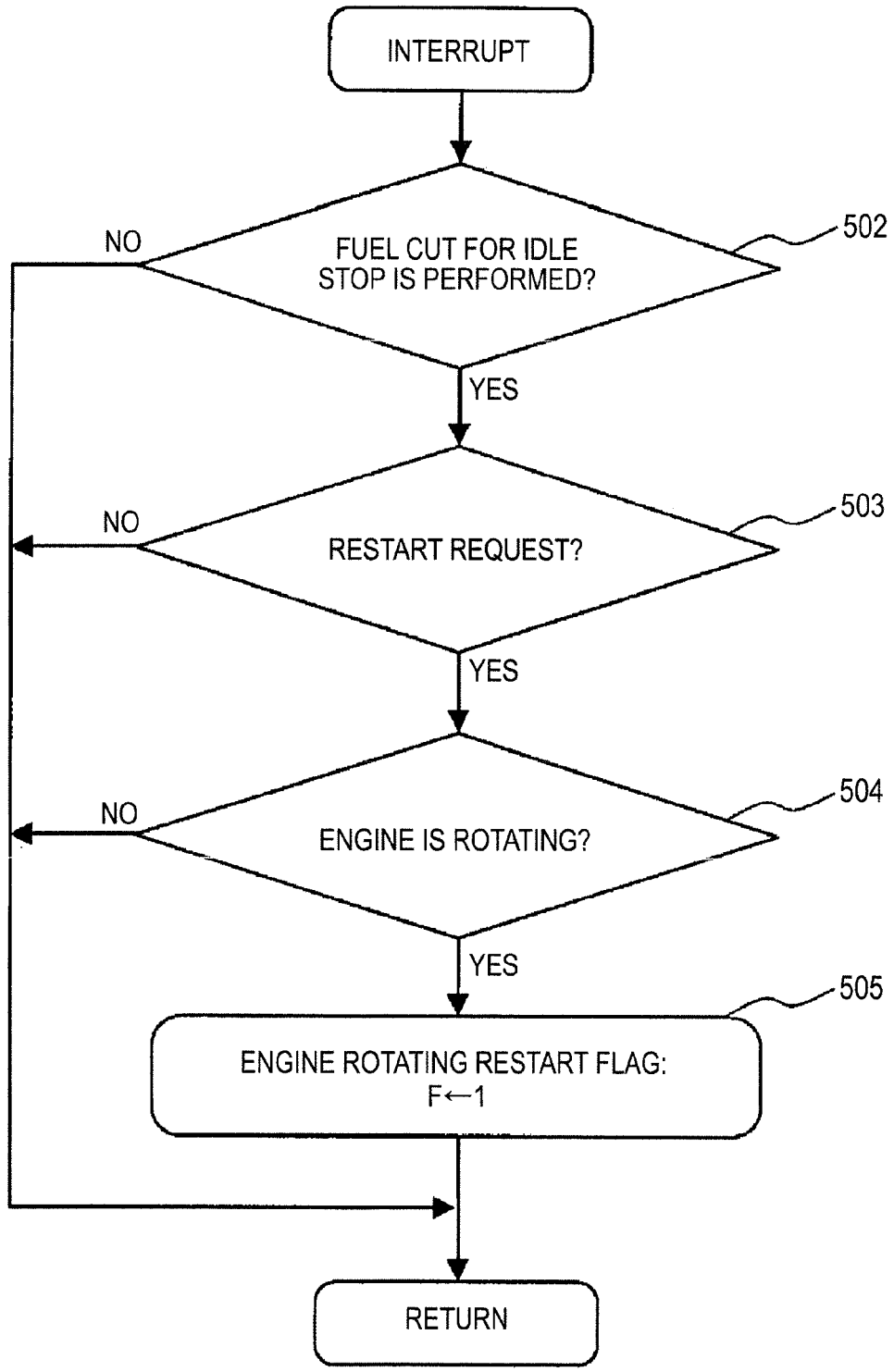
FIG. 5 is a flowchart showing the details of the processing of block 401 of FIG. 4.

The details of the above-described processing in block 401 are shown in FIG. 5 as a flowchart.

The processing shown in FIG. 5 as a flowchart is interrupt processing and is repeatedly performed at intervals of 10 ms, for example. First, in step 502, it is determined whether fuel cut for idle stop is performed or not. Then, in step 503, it is determined whether a restart request is made or not based on the information obtained from the accelerator sensor 302 etc. If a restart request is made, the procedure proceeds to step 504, and it is determined whether the engine is rotating or not. If the engine is rotating, since it can be determined that a restart request is made before the engine is stopped after the idle stop condition is satisfied, an engine rotating restart flag F indicating that the restart request is a restart request made while the engine is rotating is set to 1 in step 505.

In block 402 of FIG. 4, the driving of the starter 260 is started when the engine rotating restart flag F becomes 1.

In block 403, a computation is performed to determine a target fuel pressure (a boosted voltage value) to be attained, and the high-pressure fuel pump 209 is driven in block 404 in such a way as to attain the target fuel pressure. The fuel pressure is boosted to accelerate atomization of the fuel to improve combustion, ensure atomization time by reducing an injection period for a restart request which may be made in the latter period of a compression stroke, and raise an upper limit of the number of split injections by reducing the injection time. To raise the fuel pressure, the target fuel pressure of high-pressure fuel pump control is changed to a higher value.

Figure 8:
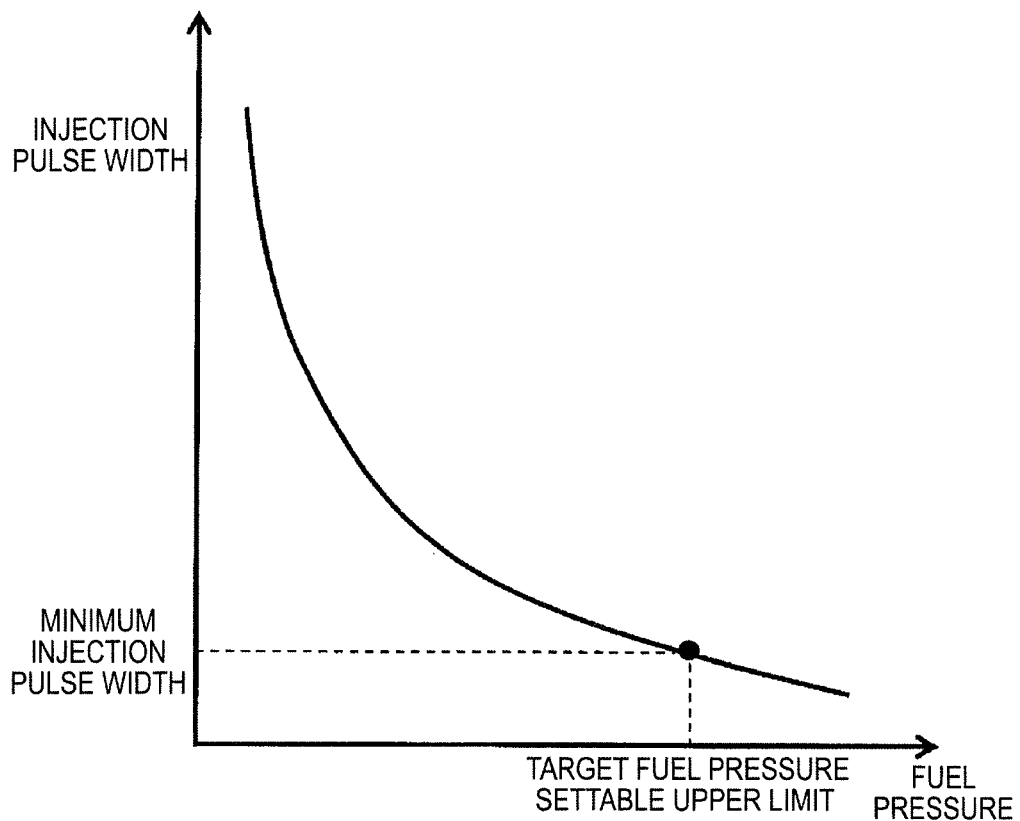
FIG. 8 is a diagram showing the relationship between the fuel pressure and the injection pulse width in the control device shown in FIG. 1.

Here, the injector has the following characteristics. Under the same injection pulse width condition, the higher the fuel pressure, the larger the injection quantity becomes. Moreover, for the injection pulse width, the injection quantity has the following characteristics. In a region in which the injection pulse width is a given injection pulse width or more, the linearity is maintained; when the injection pulse width becomes an injection pulse width which is less than a given injection pulse width, the injection quantity becomes unstable. For this reason, a lower limit that can be used as an injection pulse width is limited to a minimum value at which the linearity is maintained. In FIG. 8, the relationship between the fuel pressure and the injection pulse width (corresponding to the injection time) when the fuel injection quantity of the injector is constant is shown. When the fuel pressure rises, the injection pulse width is reduced. At this time, the target fuel pressure is set in such a way that the injection pulse width does not fall below the minimum value at which the injection quantity of the injector is stable (the linearity is maintained).

To raise the fuel pressure in a short period to a time point at which the engine is stopped, the high-pressure pump is brought into a full discharge state when the engine rotating restart flag F becomes 1.

In block 405, based on the signals obtained from the crank angle sensor 216 and the cam angle sensor 211, a piston position in each cylinder at that point in time when the engine rotating restart flag F became 1 is determined, and an optimum restart combustion mode for that piston position is determined by the performance of a computation and is selected for each cylinder.

Figure 6:
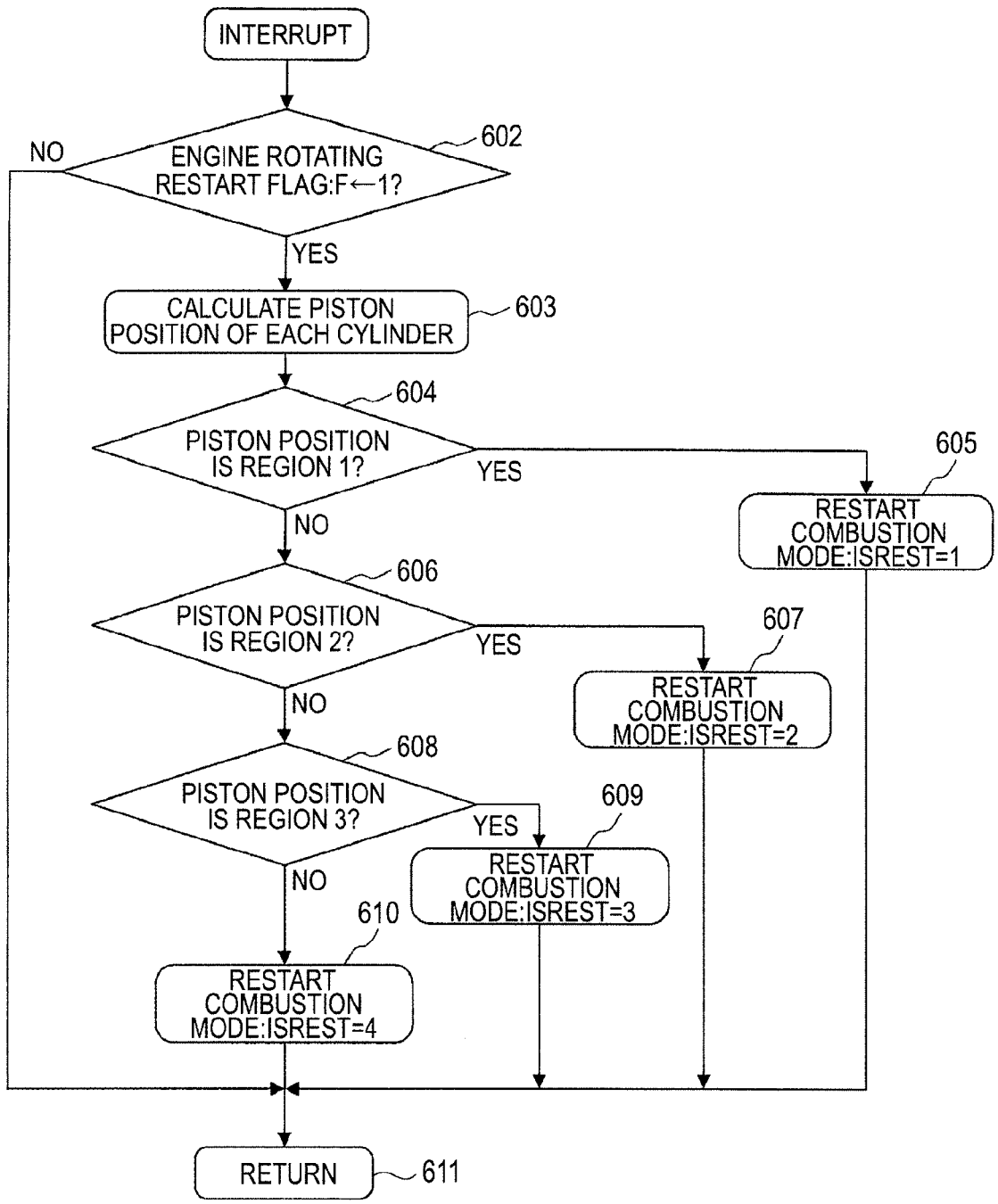
FIG. 6 is a flowchart showing the details of the processing of block 405 of FIG. 4.

The detail of the above-described processing in block 405 is shown in FIG. 6 as a flowchart.

The processing shown in FIG. 6 as a flowchart is interrupt processing and is repeatedly performed at intervals of 10 ms, for example. First, in step 602, it is determined whether the engine rotating restart flag F is 1 or not, that is, the restart request is a restart request made before the engine is stopped (made while the engine is rotating). If the restart request is a restart request made while the engine is rotating (if the flag F is 1), the procedure proceeds to step 603. If the restart request is not a restart request made while the engine is rotating (if the flag F is not 1), the procedure goes back to the start. In step 603, based on the signals from the crank angle sensor 216 and the cam angle sensor 211, the piston position of each cylinder is calculated. When the piston position is in the latter period of the compression stroke, it is determined in step 604 that the piston position is region 1 and a restart combustion mode ISREST is set to 1 (step 605). When the piston position is in the middle period of the compression stroke, it is determined in step 606 that the piston position is region 2 and the restart combustion mode ISREST is set to 2 (step 607). When the piston position is in the middle period of the intake stroke to the early period of the compression stroke, it is determined in step 608 that the piston position is region 3 and the restart combustion mode ISREST is set to 3 (step 609). When the piston position is in the early period of the intake stroke, the restart combustion mode ISREST is set to 4 in step 610. The ranges of the regions 1, 2, 3, and 4 differ from one another depending on the combustion performance of the engine. Moreover, since the piston positions of the cylinders when the restart request is made differ from one another (in the case of four cylinders, the piston positions of the cylinders are displaced 180 crank degrees with respect to one another), the restart combustion mode ISREST is determined for each cylinder by the performance of a computation.

Figure 7:
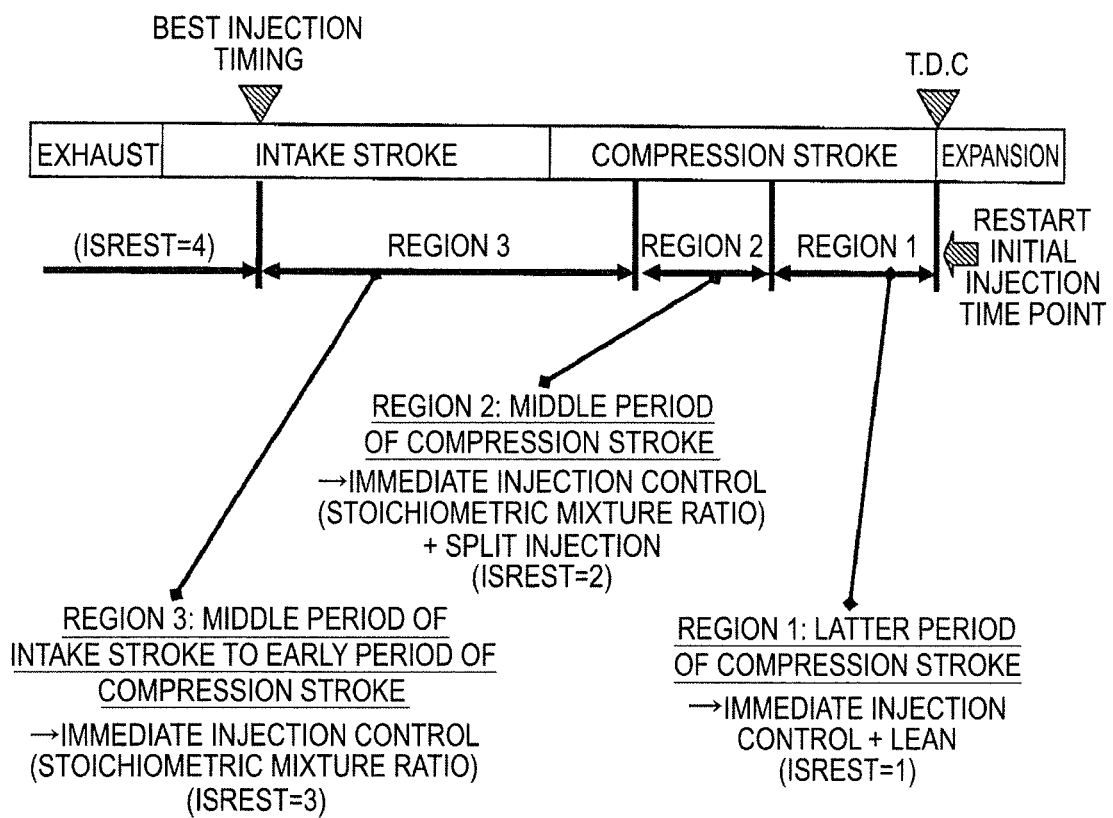
FIG. 7 is a diagram showing the relationship among a piston position, regions 1, 2, 3, and 4, and a restart combustion mode when a restart request is made.

In FIG. 7, the relationship among the piston position, the regions 1, 2, 3, and 4, and the restart combustion mode is shown.

When the piston position is the region 1 (the latter period of the compression stroke), the restart combustion mode ISREST is set to 1. In this case, injection of the fuel is started immediately when the restart combustion mode ISREST is confirmed to be 1 (almost as soon as the piston position is calculated or the restart request is made). Therefore, a restart initial injection time point (injection start timing) is in the latter period of the compression stroke in the region 1 to ensure atomization time. Moreover, to prevent emission of soot, fuel spraying is stratified and the fuel injection quantity is set so that the air/fuel ratio of the air fuel mixture used for combustion is leaner than the stoichiometric mixture ratio.

Figure 9:
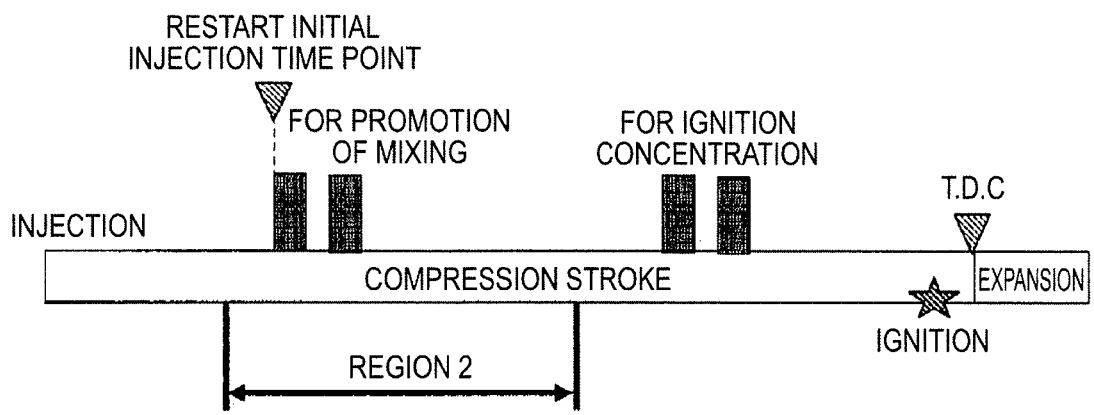
FIG. 9 is a diagram showing an example of split injection performed in the control device shown in FIG. 1.

When the piston position is the region 2 (the middle period of the compression stroke), the restart combustion mode ISREST is set to 2. Also in this case, injection of the fuel is started immediately when the restart combustion mode ISREST is confirmed to be 2 (almost as soon as the piston position is calculated or the restart request is made). Therefore, a restart initial injection time point (injection start timing) is in the middle period of the compression stroke in the region 2 to ensure atomization time. Moreover, performing fuel injection more than once in one combustion cycle (performing split injection) achieves a higher degree of mixing of fuel and air in the combustion chamber and ensures the concentration of air fuel mixture necessary for ignition timing. In FIG. 9, an example of split injection is shown. Here, an example in which four injections in total: two injections performed in the middle period of the compression stroke and two injections performed in the latter period of the compression stroke in the region 2 (four-stage injection) are performed is shown.

When the piston position is the region 3 (the middle period of the intake stroke to the early period of the compression stroke), the restart combustion mode ISREST is set to 3. Also in this case, injection of the fuel is started immediately when the restart combustion mode ISREST is confirmed to be 3 (almost as soon as the piston position is calculated or the restart request is made). Therefore, a restart initial injection time point (injection start timing) is in the middle period of the intake stroke to the early period of the compression stroke in the region 3 to ensure atomization time. The beginning of the region 3 in which ISREST=3 is set at injection timing (best injection timing) at which the best combustion performance is achieved at the time of injection in the intake stroke.

When the piston position is the region 4 (the region other than the regions 1, 2, and 3), the restart combustion mode ISREST is set to 4. In the region in which the restart combustion mode ISREST=4, fuel injection is performed according to the best injection timing which corresponds to the beginning of the region 3 in which ISREST=3.

Unlike a case in which restart is carried out after the engine is completely stopped, the combustion robustness of initial injection performed when restart is carried out before the engine is stopped (while the engine is rotating) is increased by the performance of appropriate stratification and split injection according to the piston position as in this embodiment due to the presence of the flow of air and an appropriate compression pressure in the combustion chamber. This makes it possible to prevent the amount of emission of soot from increasing and the exhaust performance from worsening.

In blocks 405 to 409 of FIG. 4, injection (start) timing, an injection pulse width (corresponding to the injection quantity), ignition timing, and a target throttle opening appropriate for the above-described restart combustion mode ISREST are determined by the performance of a computation, and in blocks 410 to 412, control of driving of the injectors, the ignition coils, and the electrically controlled throttle valve is performed.

Figure 10A:
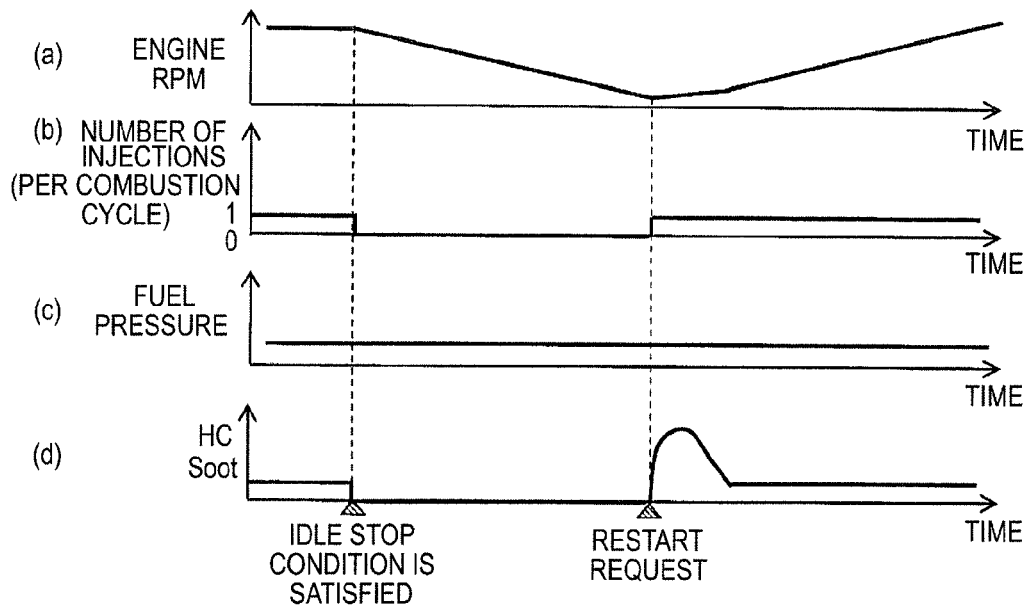
FIGS. 10A and 10B are diagrams illustrating the effects of the embodiment of the invention based on a comparison between the embodiment of the invention and an existing example.
Figure 10B:
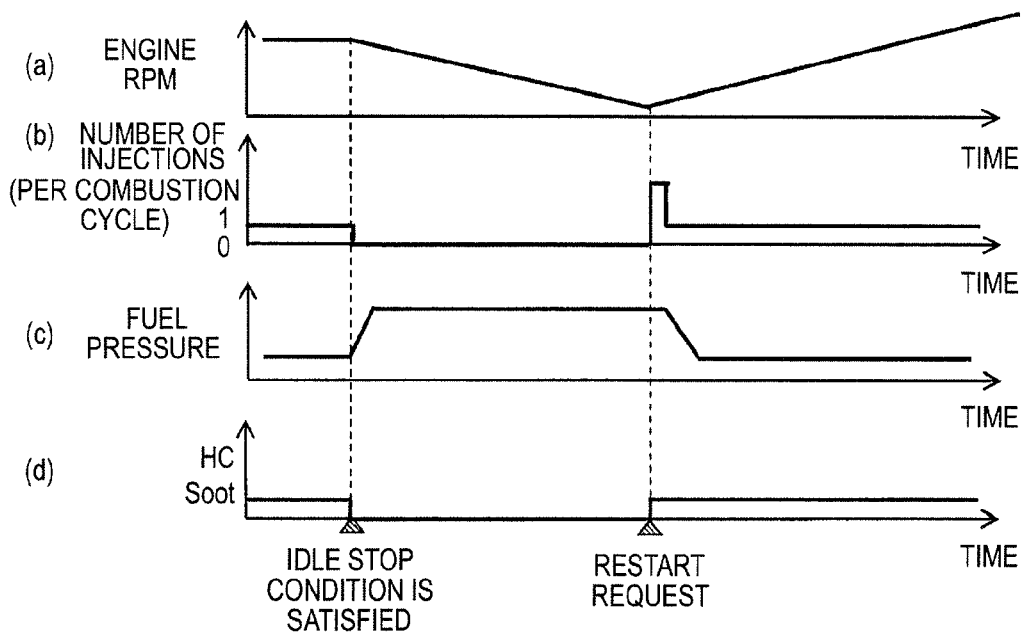

Next, with reference to FIGS. 10A and 10B, the effects of the embodiment of the invention will be described based on a comparison between the embodiment of the invention and an existing example. FIGS. 10A and 10B are time charts showing changes in the behaviors of individual portions when the piston position of a certain cylinder is the region 2 (the middle period of the compression stroke) when a restart request is made before the engine is stopped (while the engine is rotating) after the idle stop condition is satisfied.

In the existing example shown in FIG. 10A, one injection is performed at low fuel pressure in a compression stroke. Therefore, atomization time is not ensured and appropriate stratification is not performed, which may lead to unstable combustion. This results in poor engine start-up performance and an increase in soot emission and HC.

In this embodiment, an improvement in combustion itself in the compression stroke at the time of restart is obtained and the number of possible split injections is increased by increasing the fuel pressure after the idle stop condition is satisfied. Moreover, split injection which is an optimum combustion mode is adopted. This improves restart performance and prevents an increase in soot emission and HC.

That is, in the embodiment of the invention, an optimum restart combustion mode is selected according to the piston position of each cylinder when a restart request is made before the engine is stopped after the idle stop (engine stop) condition is satisfied. This makes it possible to achieve stable combustion and improvements in exhaust performance and fuel efficiency.

While the embodiment of the invention has been described in detail, the invention is not limited to the embodiment described above and various changes can be made in the design thereof without departing from the spirit of the invention recited in the appended claims.

What is claimed is:

1. A control system of a direct injection engine, the control system comprising:
an injector directly injecting fuel into a combustion chamber; and
a control device that is configured to perform an idle stop that temporarily reduces a speed of an engine when the engine and a vehicle equipped with the engine are in a state in which the engine and the vehicle satisfy a predetermined condition, wherein
when a restart request is made after a decision to stop of the direct injection engine is made and before the engine stops rotating, at least the number of fuel injections in one combustion cycle is changed for each cylinder according to a piston position at that time.

2. The control system of a direct injection engine according to claim 1, wherein
when the piston position is in a second specific period of a compression stroke, fuel injection is performed more than once in one combustion cycle.

3. The control system of a direct injection engine according to claim 1, wherein
initial fuel injection is started immediately when the restart request is made.

4. The control system of a direct injection engine according to claim 1, wherein
a target fuel pressure of fuel to be supplied to the injector is increased while the decision to stop the engine is made.

5. The control system of a direct injection engine according to claim 4, comprising:
a fuel pump pressure-feeding the fuel to the injector; and
a common rail storing the fuel to be supplied to the injector, wherein
the fuel pressure inside the common rail is increased by bringing the fuel pump into a full discharge state so that the pressure of the fuel supplied to the injector becomes the target fuel pressure.

6. The control system of a direct injection engine according to claim 4, wherein
the target fuel pressure is varied according to a minimum injection pulse width of the injector.

7. A control system of a direct injection engine, the control system comprising:
an injector directly injecting fuel into a combustion chamber; and a control device that is configured to perform an idle stop that temporarily reduces a speed of an engine when the engine and a vehicle equipped with the engine are in a state in which the engine and the vehicle satisfy a predetermined condition, wherein when a restart request is made after a decision to stop the direct injection engine is made and before the engine stops rotating, at least one engine operating parameter is changed for each cylinder according to a piston position at that time.

8. The control system according to claim 7, wherein the at least one engine operating parameter is a number of fuel injections in one combustion cycle.

9. The control system according to claim 8, wherein the at least one engine operating parameter also is an air/fuel ratio of an air fuel mixture used for combustion.

10. The control system of a direct injection engine according to claim 9, wherein when the piston position is in a first specific period of a compression stroke, the fuel injection quantity is set so that the air/fuel ratio of the air fuel mixture used for combustion is leaner than the stoichiometric mixture ratio.

11. The control system of a direct injection engine according to claim 7, wherein when the piston position is in a second specific period of a compression stroke, fuel injection is performed more than once in one combustion cycle.

12. The control system of a direct injection engine according to claim 7, wherein initial fuel injection is started immediately when the restart request is made.

13. The control system of a direct injection engine according to claim 7, wherein a target fuel pressure of fuel to be supplied to the injector is increased while the decision to stop the direct injection engine is made.

14. The control system of a direct injection engine according to claim 13, comprising:

a fuel pump pressure-feeding the fuel to the injector; and
a common rail storing the fuel to be supplied to the injector, wherein
the fuel pressure inside the common rail is increased by bringing the fuel pump into a full discharge state so that the pressure of the fuel supplied to the injector becomes the target fuel pressure.

15. The control system of a direct injection engine according to claim 13, wherein the target fuel pressure is varied according to a minimum injection pulse width of the injector.

16. The control system of a direct injection engine according to claim 14, wherein the target fuel pressure is varied according to a minimum injection pulse width of the injector.

17. A control device for a direct injection engine comprising:

an injector driving circuit which drives the injector directly injecting fuel into a combustion chamber; and
a processing unit that is configured to perform an idle stop that temporarily reduces a speed of an engine when the engine and a vehicle equipped with the engine are in a state in which the engine and the vehicle satisfy a predetermined condition, wherein
when a restart request is made after a decision to stop the direct injection engine is made and before the engine speed becomes zero, at least the number of fuel injections in one combustion cycle is changed for each cylinder according to a piston position at that time.

* * * * *